United States Patent Office 3,060,195
Patented Oct. 23, 1962

3,060,195
3-POLYALKOXYMETHYLOXY - 1 - POLYALKOXY-METHYLOXY - 2 - METHYL - PROPYL 1 - 3',4' METHYLENEDIOXYPHENYL SYNERGISTS
Oscar F. Hedenburg, Pittsburgh, Pa., assignor to Rex Research Corporation, Toledo, Ohio, a corporation of Delaware
No Drawing. Filed July 20, 1960, Ser. No. 44,008
6 Claims. (Cl. 260—340.5)

This invention relates to new chemical compounds especially valuable for use in insecticidal compositions as synergists for the insecticidal effectiveness of pyrethrins, allethrin and other insecticidally active compounds closely related to pyrethrins and allethrin, for instance, cyclethrin and furethrin. The invention includes the new compounds, per se, and an effective method for producing them and also insecticidal compositions synergized by one or more of these new compounds.

The new compounds of my present invention may be characterized structurally as being composed of an isosafrole radical to which two radicals of the formula R—[—O—(CH$_2$)$_m$]$_n$— have been connected at the unsaturated bond of the side chain through separate formal linkages, —O—CH$_2$—O— and —CH$_2$—O—CH$_2$—O—, respectively, as represented by the following formula:

(1)
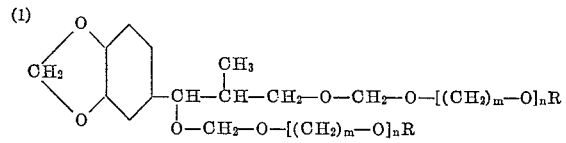

in which R is an alkyl radical of from 1 to 4 carbon atoms, $m$ is an integer 2 or 3 and $n$ is an integer 1 or 2.

My new chemical compounds are produced in accordance with my present invention by reaction, in the presence of a strong, nonvolatile acid catalyst, of one mole of isosafrole, substantially 3 moles of formaldehyde (preferably added as the equivalent of paraformaldehyde) and 2 moles of an alcohol represented by the formula:

R—[—O—(CH$_2$)$_m$]$_n$—OH in which R, $m$ and $n$ are as hereinbefore defined, at an elevated temperature not exceeding 100° C. nor less than about 60° C. and preferably about 75°–85° C.

Though I may use as the alcohol constituent any of the alcohols represented by the foregoing formula, I have found that products having exceptionally high synergistic activity are obtained where R is an alkyl radical of 2 to 4 carbon atoms, for instance, as in butoxyethyl alcohol or ethoxyethyl alcohol and, especially, butoxyethoxyethyl alcohol.

As the nonvolatile strong acid catalyst, I have, with particular advantage, used p-toluenesulfonic acid. However, in lieu thereof, or in conjunction therewith, I may use, for instance, naphthalenesulfonic acid, or benzenesulfonic acid.

These acid catalysts serve to promote depolymerization of the paraformaldehyde, when that is used as the source of formaldehyde, and also aid in the interaction of the formaldehyde, alcohol and isosafrole. The proportion of acid catalyst used is subject to considerable variation but for optimum results should be used in a proportion within the range equivalent to about 1 gram to about 6 grams of acid per mole of isosafrole used in the formulation, preferably not over about 4 grams.

It has previously been proposed to react isosafrole, formaldehyde and an alkoxyethyl or an alkoxyethoxyethyl alcohol in the presence of a strong nonvolatile acid such as noted above. According to such proposal, substantially equal molar proportions of the alcohol and the isosafrole were used. Though the product of that reaction was found to be a valuable synergist when used in conjunction with pyrethrins in insecticidal compositions, the "kill" of houseflies was not uniformly high. An advantage of my present invention is that the synergistic activity of the compounds thereof, in conjunction with pyrethrins, allethrin or the like, is such as to produce a uniformly high kill of houseflies, for instance, as hereinafter illustrated.

In carrying out the process of my present invention, the paraformaldehyde, the alcohol constituent, e.g., butoxyethoxyethyl alcohol, and the acid catalyst, in the above-indicated proportions are first mixed together and the mixture heated until the paraformaldehyde is substantially completely dissolved in the alcohol solution. In this preliminary stage of the operation, the mixture is, with advantage, heated to about 85° to 90° C. and a heating period of about 20 to 30 minutes is usually required. There results a mixture of formal, hemiformal, formaldehyde and water. As the heating is continued, the formal is hydrolyzed to hemiformal and alcohol and the liberated alcohol reacts with formaldehyde to form further hemiformal. The solution is then cooled to about 60° C. and the isosafrole is added and mixed therewith. The solution is then heated, preferably to about 75°–85° C., and maintained at that temperature until the reaction is completed, usually requiring about 7 or 8 hours or, in some cases, several days. The duration of this heating period necessary for completion of the reaction may be readily determined by testing the reaction mixture for unreacted isosafrole and during this period, water liberated by the reaction should be retained in the reaction mixture.

Upon adding the isosafrole, as described above, the temperature of the mixture tends to increase due to heat of reaction. During this period, the temperature of the batch should be carefully watched for the first 15 to 30 minutes following the addition of the isosafrole, and cooled, if necessary, to avoid excessive temperatures. The preliminary preparation of the formaldehyde, alcohol, acid catalyst solution, as described above, prior to the addition of the isosafrole, and retention of water in the mixture until the reaction is substantially completed, appear to be essential to the production of the novel chemical compounds of my present invention.

Though I do not intend to be bound to any theory as to stepwise reactions, it is my present belief that the formaldehyde reacts with the alcohol to form a mixture of hemiformal and formal, formaldehyde hydrate and water are also being formed, and that upon addition of the isosafrole, the reaction proceeds as follows:

(2)

Isosafrole      Formaldehyde Hydrate

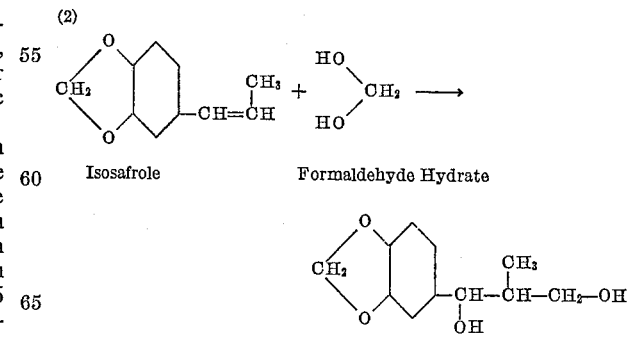

3,4-methylendioxyphenyl-1,3-isobutylene glycol

Two molecules of the hemiformal are then believed to react with the intermediate product of Formula 2 to produce the final product represented by Formula 1. As the hemiformal is used up by the reaction, more is formed by reaction between the formal and water. It is believed that the hemiformal,

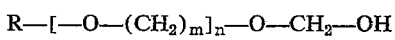

may also be formed and is able to add directly to the double bond yielding:

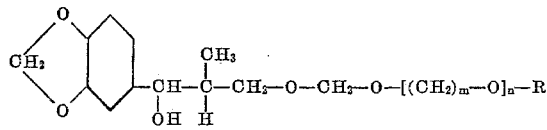

The alcohol group can then react with one mole of formaldehyde and one mole of the alcohol to give the final Formula 1.

In the course of the above-described reactions, water is formed. As previously noted, this water must not be removed from the reaction mixture until the reaction has been substantially completed, as the presence of water appears to be necessary to promote conversion of the formal to the hemiformal and to aid in completion of the reaction.

After the above-indicated reaction has been completed, the water should be removed from the reaction mixture. This may be accomplished by conventional means, as by azeotropic distillation or by distillation at reduced pressure.

Though not necessary, the above-described reaction may be carried on in the presence of an inert volatile solvent, for instance benzene or hexane, with refluxing to return the solvent and water to the reaction mixture during the reaction, and upon completion of the reaction, the solvent may be used to carry off the water. Usually, I prefer to carry the reaction to substantial completion in the absence of such volatile, inert solvent and to eliminate the water from the mixture by low pressure distillation. However, for experimental purposes, I have in the following examples added hexane after the reaction had been substantially completed and refluxed the mixture over a water trap so as to determine the proportions of water and unreacted constituents in the reaction mixture.

In any event, the final removal of water is necessary in order to fully complete the reaction since water, in the presence of the acid catalyst, will hydrolyze the products represented by Formula 1.

Finally, the product of the reaction should be treated to remove any unreacted formaldehyde and neutralize any acid present and for this purpose, I have, with advantage, washed the product with an aqueous solution of sodium sulfite. Sodium bicarbonate, or other water-soluble base, may be used for this purpose but are less effective than sodium sulfite.

The invention and the effectiveness thereof will be further illustrated by the following examples. It will be understood, however, that the scope of the invention is not restricted to the specific illustrations but is to be measured by the appended claims.

*Example I*

In this operation, the indicated reactants and acid catalyst were used in the following proportions:

Isosafrole_____ 85 grams (approximately 0.5 mole).
Butoxyethoxyethyl alcohol_____ 162 grams (1 mole).
Paraformaldehyde_____ 44 grams (containing 41.8 grams $CH_2O$).
p-Toleneculfonic acid____ 1 gram.

In carrying out the operation, the alcohol, paraformaldehyde and acid were first mixed and the mixture heated to about 85° C. until the formaldehyde was substantially completely dissolved. The temeprature of the mixture was then lowered to about 60° C. and the isosafrole added. The temperature of the mixture was then maintained at about 75° C. for 8 hours at which time the reaction was substantially complete. 100 cc. of hexane was then added and the solution was refluxed over a water trap for 3 hours. There was collected in the water trap 13 cc. of an aqueous solution containing 4.2 grams of formaldehyde, the amount of water thus removed, therefore, closely approximating the 9 grams theoretically produced.

The product was then washed with an aqueous solution of 4.2 grams of sodium sulfite (anhydrous) whereby 0.4 gram of formaldehyde was extracted from the solution. An additional 0.2 gram of formaldehyde polymer was found in the condenser. The total amount of formaldehyde thus recovered was 4.8 grams. The remaining 37 grams formaldehyde, or 88.5% of the total formaldehyde used, remained in the product.

Thereafter, the solvent was removed by reduced pressure distillation leaving 276 grams of an orange-color oil having a specific gravity of 1.052. An insecticidal composition composed of 440 milligrams of this product and 30 milligrams of pyrethrins in 100 cc. of odorless base oil, when tested by the conventional Peet-Grady test against houseflies, exhibited a knockdown of 95.5% and a kill of 95.5% as compared with the results of OTI (Official Test Insecticide) of 96.1% knockdown and 53.9% kill.

*Example II*

In this operation, the identity and proportions of the reactants and catalyst used were as follows:

Isosafrole_____ 81 grams (0.5 mole).
Butoxyethoxyethyl alcohol_____ 162 grams (1 mole).
Paraformaldehyde_____ 50 grams (containing 47.5 grams $CH_2O$).
Toluenesulfonic acid____ 2 grams.

The initial procedure was as described in Example I. The isosafrole was then added and the mixture heated to 85° C. for 7 hours at which time the reaction was substantially complete. Upon adding 100 cc. of hexane and refluxing over a water trap to eliminate water, as described in Example I, 13 cc. of an aqueous solution containing 3.58 grams of formaldehyde was trapped. The product was washed with an aqueous solution of 8.4 grams sodium sulfite (anhydrous), resulting in the extraction of an additional 0.61 gram formaldehyde. 43.31 grams of formaldehyde remained bound in the product, representing 96.1% of the calculated 45 grams of formaldehyde required for the reaction. Following distillation of the solvent, the product was found to weigh 277 grams. Upon heating the product to 200° C. at reduced pressure, 17.4 grams of isosafrole and alcohol were distilled off leaving 93.6% of undistilled product, based on the total weight of reactants used. The amount of isosafrole thus unreacted was estimated to be approximately 7 grams indicating that 74 grams of the isosafrole, or 91.3% of the total isosafrole used, had reacted.

When used in an insecticidal composition, as described in Example I, the percentage knockdown and kill of houseflies closely approximated those of Example I.

*Example III*

In this operation, the identity and proportions of reactants used were as follows:

Isosafrole_____ 81 grams (0.5 mole).
Ethoxyethoxyethyl alcohol_____ 134 grams (1 mole).
Paraformaldehyde_____ 52 grams (containing 49.4 grams $CH_2O$).
Toluenesulfonic acid_____ 1 gram.

The formaldehyde, alcohol and acid catalyst were first mixed and heated as in Example I and following the addition of the isosafrole thereto the mixture was heated at 75° C. for 2 days at which time the reaction was substantially complete. 100 cc. of hexane was then added and there was recovered, by refluxing over a water trap, 15 cc. of an aqueous solution containing 4.05 grams formaldehyde. By washing the product with an aqueous solution of 8.4 grams of sodium sulfite, 0.62 gram of formaldehyde was extracted and an additional 0.2 gram of formaldehyde polymer was collected in the condenser, making a total of 4.87 grams of unreacted formaldehyde or 44.53 grams of formaldehyde reacted and remaining in the product, equivalent to 99% of the theoretically required 45 grams. After distilling the solvent at reduced pressure, the product was found to weigh 232 grams, as compared with the theoretical 248 grams. This discrepancy was due to the solubility of the product produced with the ethoxyethoxyethyl alcohol, as well as the alcohol itself, in the sodium sulfite wash water.

An insecticidal composition consisting of 300 milligrams of the product of the foregoing example and 30 milligrams of pyrethrins in 100 cc. of odorless base oil exhibited a knockdown of 68.6% and a kill of 32.9%, as compared with the results using OTI of a knockdown of 84.8% and a kill of 31.3%.

From these tests, it is apparent that the synergistic properties of the product prepared using butoxyethoxyethyl alcohol, as the alcohol constituent, are superior to those prepared using the ethoxyethoxyethyl alcohol.

*Example IV*

The reactants and proportions thereof were as follows:

Isosafrole_____ 81 grams (0.5 mole).
Butoxyethyl alcohol_____ 118 grams (1 mole).
Paraformaldehyde_____ 52 grams (49.4 grams $CH_2O$).
Toluenesulfonic acid_____ 1 gram.

Following preparation of the formaldehyde, alcohol and acid solution as described in Example I, the isosafrole was added and the mixture heated at 75° C. for 2 days. Water was then expelled from the reaction mixture and the mixture washed free of acid, as described in Example I, and it was found that 44.41 grams, or 98.7% of the calculated 45 grams of formaldehyde, had reacted. Following distillation of the solvent at reduced pressure, the product was found to weigh 235 grams, as compared with the calculated 232 grams.

An insecticidal composition consisting of 300 milligrams of the product and 30 milligrams pyrethrins in 100 cc. odorless base oil, when tested against houseflies by the Peet-Grady method, showed a knockdown of 76.1% and a kill of 47.8%, as compared with the OTI values of 84.8% knockdown and 31.3% kill.

It will be understood that the OTI, i.e., Official Test Insecticide, referred to herein, was composed of 100 milligrams of pyrethrins dissolved in 100 cc. of an odorless base oil of the type conventionally used as the vehicle in such insecticidal compositions.

I claim:
1. Compounds of the formula:

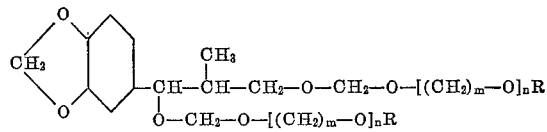

in which R is alkyl of from 1 to 4 carbon atoms, $m$ is an integer from 2 to 3 and $n$ is an integer from 1 to 2.

2. The compounds of claim 1 in which R is butyl.
3. The compounds of claim 1 in which R is ethyl.
4. The compounds of claim 1 in which R is butyl, $m$ is the integer 2 and $n$ is the integer 2.
5. Method for producing organic chemical compounds which comprises mixing a strong, nonvolatile acid catalyst of the group consisting of p-toluenesulfonic acid, naphthalenesulfonic acid and benzenesulfonic acid and paraformaldehyde with an alcohol of the formula

in which R is alkyl of from 1 to 4 carbon atoms, $m$ is an integer from 2 to 3 and $n$ is an integer from 1 to 2, heating the mixture until the paraformaldehyde has substantially completely dissolved, adding isosafrole to the solution and heating to a temperature within the range of 60°–100° C. until the reaction is substantially completed and separating from the reaction mixture water liberated by the reaction, the proportions of the reactants being substantially as follows:

Isosafrole_____ 1 mole.
Alcohol_____ 2 moles.
Paraformaldehyde_____ Equivalent to 3 moles $CH_2O$.
Strong, nonvolatile acid catalyst_____ 1 to 6 grams.

6. The method of claim 5 in which, following the addition of the isosafrole, the mixture is heated to a temperature of 75°–85° C.

References Cited in the file of this patent
UNITED STATES PATENTS 2,431,844 Synerholm _____ Dec. 2, 1947
2,485,681 Wachs _____ Oct. 25, 1949
2,494,458 Synerholm _____ Jan. 10, 1950
2,521,366 Hedenburg _____ Sept. 5, 1950
2,550,737 Wachs _____ May 1, 1951

OTHER REFERENCES

Sweeney: Chemical Abstracts, vol. 52, page 643e, 1958.
The Merck Index, 7th ed., 1960, published by Merck and Co., Inc., Rahway, N.J., pages 581 and 915.